United States Patent Office 3,019,203
Patented Jan. 30, 1962

3,019,203
DIEPOXY SULFONE COMPOSITIONS
Charles T. Patrick, Jr., and Charles W. McGary, Jr., South Charleston, W. Va., assignors to Union Carbide Corporation, a corporation of New York
No Drawing. Filed Mar. 31, 1960, Ser. No. 18,817
53 Claims. (Cl. 260—18)

This invention relates to diepoxy sulfone compositions. In various aspects, this invention relates to curable, polymerizable compositions comprising a diepoxy sulfone and an active organic hardener, to the thermosetting intermediate reaction products, and to the cured, polymerized products resulting therefrom.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. Little, if any, shrinkage occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel curable, partially cured, and cured compositions comprising a diepoxy sulfone and an active organic hardener. It is another object of the invention to prepare novel curable, polymerizable compositions comprising a diepoxy sulfone, an active organic hardener, and a modifying amount of a different active organic compound to thereby impart special and desirable characteristics and properties to ultimately, fully cured compositions. It is a further object of the invention to prepare novel curable compositions and partially cured compositions (thermosetting intermediate reaction products) comprising a diepoxy sulfone and an active organic hardener which compositions when dissolved in an inert normally-liquid organic medium are useful in the fields of coatings, laminates, adhesives, and the like. A still further object of the invention is to prepare novel thermosetting intermediate reaction solid products resulting from the partial reaction of a composition comprising a diepoxy sulfone and an active organic hardener which products are useful as molding powder compositions. Another object of the invention is to provide novel and useful high molecular weight polymeric varnish compositions which result from the homopolymerization of the hydroxy- and epoxy-containing products prepared by the reaction of a diepoxy sulfone and an aliphatic hydrocarbon monocarboxylic acid. It is also an object of the invention to prepare novel and useful high molecular weight polymeric varnish compositions which result from the esterification of fusible, soluble polymeric polyhydric alcohols with organic fatty acids, said polymeric polyhydric alcohols being prepared by the reaction of a diepoxy sulfone and a polyol. A further object of the invention is to provide novel, useful curable and cured compositions comprising a diepoxy sulfone, a polyepoxide, and an active organic hardener. Numerous other objects of the present invention will become apparent to those skilled in the art from a consideration of the disclosure.

The diepoxy sulfones contemplated as a component in the novel compositions of the invention can be characterized by the following formula:

I   R—O—X—SO$_2$—X—O—R wherein each R, individually, can be (a) a vic-epoxyalkyl radical in which the vic-epoxy group is at least one carbon atom removed from the oxy group, i.e., —O—, shown in the above formula, (b) a vic-epoxycyclohexyl radical in which the vic-epoxy group is contained in the cycloaliphatic ring and is at least one carbon atom removed from the oxy, —O—, group (c) a vic-epoxycyclohexylalkyl radical in which the vic-epoxy group is contained in the cycloaliphatic ring, (d) a 3-oxatricyclo[3.2.1.0$^{2,4}$]-6-octyl radical, or (e) a 3-oxatetracyclo[4.4.0.1$^{7,10}$.0$^{2,4}$]-8-undecyl radical; and wherein X is a divalent saturated aliphatic hydrocarbon radical which contains at least 2 carbon atoms, and preferably from 2 to 6 carbon atoms. It should be noted at this time that the expression "vic-epoxy", as used herein including the appended claims, refers to the group

i.e., wherein the oxygen atoms is bonded to vicinal carbon atoms. This term "vic-epoxy" is a recognized abbreviation for the expression "vicinal epoxy." The notation that the vic-epoxy group is contained in the cycloaliphatic ring indicates that the carbon atoms of said vic-epoxy group form a part of the cycloaliphatic ring or nucleus. In addition, the expression "lower alkyl," as used herein including the appended claims, refers to a monovalent saturated aliphatic hydrocarbon radical which contains from 1 to 4 carbon atoms. Moreover the "alkyl" moiety in the expression "vic-epoxycycloalkylalkyl" indicates that this moiety preferably contains up to 7 carbon atoms, is monovalently bonded to the 'vic-epoxycycloalkyl' group, and also, is monovalently bonded to the oxy group, i.e., —O— group.

With reference to Formula I supra, illustrative R variables include, among others 2,3-epoxypropyl
2,3-epoxybutyl
2-methyl-2,3-epoxypropyl,
2-methyl-2,3-epoxybutyl
2,3-epoxypentyl,
2,3-epoxyhexyl
2,3-epoxyoctyl
4,5-epoxyhexyl
4,5-epoxypentyl 5,6-epoxyoctyl
10,11-epoxyundecyl
9,10-epoxydecyl
9,10-epoxyoctadecyl
3,4-epoxycyclohexyl
3-ethyl-3,4-epoxycyclohexyl
4-methyl-2,3-epoxycyclohexyl
6-n-butyl-3,4-epoxycyclohexyl
5-amyl-3,4-epoxycyclohexyl
2,4-diethyl-3,4-epoxycyclohexyl
3,4-epoxycyclohexylmethyl
2-n-propyl-3,4-epoxycyclohexylmethyl
5-ethyl-3,4-epoxycyclohexylpropyl
3,4-epoxycyclohexylamyl
3-oxatricyclo[3.2.1.0$^{2,4}$]-6-octylmethyl
alkyl substituted 3-oxatricyclo[3.2.1.0$^{2,4}$]-6-octyl
3-oxatetra-cyclo[4.4.0.1$^{7,10}$.0$^{2,4}$]-8-undecyl
lower alkyl substituted 3-oxatetracyclo[4.4.0.1$^{7,10}$.0$^{2,4}$]-8-undecyl and the like. Representative X radicals include, for instance, ethylene, propylene, tetramethylene, pentamethylene, and the like.

Illustrative subclasses of diepoxy sulfones include, for example bis(vic-epoxyalkyloxyalkyl) sulfone
bis(vic-epoxycyclohexyloxyalkyl) sulfone
bis(lower alkyl substituted vic-epoxycyclohexyloxyalkyl) sulfone
bis(vic-epoxycyclohexylalkyloxyalkyl) sulfone
bis(lower alkyl substituted 3-oxatricyclo[3.2.1.0$^{2,4}$]-6-octyloxyalkyl) sulfone
bis(3-oxatetracyclo[4.4.0.1$^{7,10}$.0$^{2,4}$]-8-undecyloxyalkyl) sulfone
vic-epoxy-alkyloxyalkyl 3-oxatricyclo[3.2.1.0$^{2,4}$]-6-octyloxyalkyl sulfone
vic-epoxycyclohexyloxyalkyl 3-oxatetracyclo[4.4.0.1$^{7,10}$.0$^{2,4}$]-8-undecyloxyalkyl sulfone
and the like.

Specific examples of diepoxy sulfones include, for instance bis(2,3-epoxypropyloxyethyl) sulfone
bis(2,3-epoxypropyloxypropyl) sulfone
bis(2,3-epoxypropyloxybutyl) sulfone
bis(2-methyl-2,3-epoxypropyloxyethyl) sulfone
bis(2-ethyl-2,3-epoxyhexyloxyethyl) sulfone
bis(9,10-epoxyoctadecyloxypropyl) sulfone
bis(10,11-epoxyundecyloxybutyl) sulfone
bis(3,4-epoxycyclohexyloxypropyl) sulfone
bis(2-methyl-3,4-epoxycyclohexyloxyethyl) sulfone
bis(2,5-dimethyl-3,4-epoxycyclohexyloxypropyl) sulfone
bis(2,3-epoxycyclohexylmethyloxyethyl) sulfone
bis(3,4-epoxycyclohexylethyloxypropyl) sulfone
bis(lower alkyl substituted 3,4-epoxycyclohexylmethyloxypropyl) sulfone
bis(3-oxatricyclo[3.2.1.0$^{2,4}$]-6-octyloxyethyl) sulfone
bis(3-oxatetracyclo[4.4.0.1$^{7,10}$.0$^{2,4}$]-8-undecyloxypropyl) sulfone
2,3-epoxypropyloxyethyl 2,3-epoxyhexylethyl sulfone
2,3-epoxypropyloxyethyl 3-oxatricyclo[3.2.1.0$^{2,4}$]-6-octyloxypropyl sulfone
2-ethyl-2,3-epoxyhexyloxypropyl 3,4-epoxycyclohexyloxyethyl sulfone
9,10-epoxyoctadecyloxypropyl 2-methyl-3,4-epoxycyclohexyloxyethyl sulfone
bis(ethyl substituted 3-oxatetracyclo[4.4.0.1$^{7,10}$.0$^{2,4}$]-8-undecyloxyethyl) sulfone
bis(dimethyl substituted 3-oxatetracyclo[4.4.0.1$^{7,10}$.0$^{2,4}$]-8-undecyloxyethyl) sulfone
bis(lower alkyl substituted 3-oxatetracyclo[4.4.0.1$^{7,10}$.0$^{2,4}$]-8-undecyloxyethyl) sulfone
and the like.

The diepoxy sulfones employed as a component in the novel compositions of the invention can be prepared by various routes. One route involves the reaction of, for example, divinyl sulfone with an alkenyl alcohol, cyclohexenol, polycyclohexenol, etc., at elevated temperatures, e.g., about 50° to 100° C., in the presence of a basic catalyst, to produce the corresponding mono- or diether sulfone depending upon the concentration of the reactants. For example, greater than two mols of ethylenically unsaturated alcohol (ROH) per mol of divinyl sulfone will give the diether sulfone as illustrated in the following equation below.

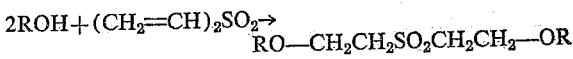

$$2ROH + (CH_2=CH)_2SO_2 \rightarrow RO-CH_2CH_2SO_2CH_2CH_2-OR$$

The use of less than one mol of ethylenically unsaturated alcohol (ROH) per mol of divinyl sulfone results in the monoether sulfone as shown below.

$$ROH + (CH_2=CH)_2SO_2 \rightarrow RO-CH_2CH_2SO_2CH=CH_2$$

The resulting monoether sulfone product then can be reacted with a molar excess of a different ethylenically unsaturated alcohol (R'OH) to produce an unsymmetrical diether sulfone as follows

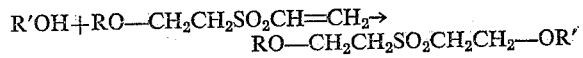

$$R'OH + RO-CH_2CH_2SO_2CH=CH_2 \rightarrow RO-CH_2CH_2SO_2CH_2CH_2-OR'$$

The resulting bis(ethylenically unsaturated ether) sulfone then can be reacted with a solution of peracid, e.g., perbenzoic acid, peracetic acid, perpropionic acid, in an inert normally-liquid organic vehicle, e.g., ethyl acetate, acetone, etc., at a temperature in the range of from about 0° to about 100° C., preferably from about 20° to about 80° C., for a period of time sufficient to introduce oxirane oxygen at the site of both carbon to carbon double bonds of the sulfone reagent. Periodic analysis of samples of the reaction mixture to determine the quantity of peracetic acid consumed during the diepoxidation reaction can be readily performed by the operator by well-known procedures. Theoretically, to effect substantially complete diepoxidation of the di(olefinically unsaturated) sulfone reagent, at least a stoichiometric quantity of peracetic acid per carbon to carbon double bond of sulfone reagent should be employed. The organic vehicle and acetic acid by-product can be recovered from the reaction product mixture, for example, by distillation under reduced pressure. If desired, the residue product can be subjected to fractional distillation, crystallization, and the like to obtain the diepoxy sulfone product in high purity. The symmetrical and unsymmetrical sulfones also can be prepared by the reaction of alkali metal sulfide with a chlorohydrin, at elevated temperatures, to produce bis(omega-hydroxyalkyl) sulfide which then can be converted to the sodium salt, followed by reacting said salt with an ethylenically unsaturated halide, at elevated temperatures, to give the bis(ethylenically unsaturated ether) sulfide. The following equation illustrates the preparation.

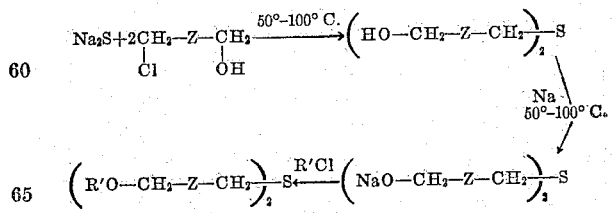

wherein Z represents a single bond bridging the two methylene groups, or it represents a divalent saturated aliphatic hydrogen radical, e.g., alkylene; and wherein $R_1$ represents an alkenyl, cycloalkenyl, or polycycloalkenyl in which the ethylenic bond, >C=C<, is at least one carbon atom removed from the chloro radical. The bis(ethylenically unsaturated ether) sulfide then can be reacted with at least 4 mols of peracid per mol of sulfide moiety, i.e., —S—, is oxidized to the sulfonyl group, tion process discussed supra. In this reaction, the sulfide moiety, i.e., -S-, is oxidized to the sulfonyl group, i.e., —SO₂—, and oxirane oxygen is introduced at the site of both carbon to carbon double bonds of the sulfide reagent.

In a broad aspect, the invention is directed to novel curable, partially cured, and cured compositions comprising a diepoxy sulfone characterized by Formula I supra and an active organic hardener. The active organic hardeners illustrated hereinafter are employed in a curing amount, that is, an amount which is sufficient to cause the curable system comprising diepoxy sulfone to become a thermosetting or thermoset resin in accordance with the teachings of the instant specification. Representative active organic hardeners include polycarboxylic acids, polycarboxy polyesters, polycarboxylic acid, anhydrides, polyols, i.e., polyhydric phenols and polyhydric alcohols, polyfunctional amines, polythiols, polyisocyanates, polyisothiocyanates, polyacyl halides, and the like. The novel compositions can contain one diepoxy sulfone or a mixture of diepoxy sulfones as well as one active organic hardener or a mixture of active organic hardeners.

The curable compositions of the invention can be prepared by mixing the diepoxy sulfone(s) with the active organic hardener(s), preferably under agitation so as to obtain a homogeneous mixture. The order of addition of the components does not appear to be critical. When a solid or highly viscous diepoxy sulfone or active organic hardener is employed, heating is advantageous in facilitating the formation of a solution. In preparing homogeneous mixtures, it is advantageous to employ a temperature as high as the melting point of the highest melting component contained in the curable mixture. In any event the application of heat should not be prolonged to the extent that appreciable curing takes place.

The curable compositions of the invention can be partially cured or fully cured by maintaining the temperature in the range of from about 10° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperaure within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable compositions is that at which said compositions form a uniform melt, whereas for coatings and the preparation of laminates, the use of solvents will allow the use of lower temperature.

The time for effecting the partial cure of complete cure will be governed, to an extent, on several factors such as the particular diepoxy sulfone(s) employed, the particular active organic hardener(s) employed, the proportions of diepoxy sulfone and active organic hardener, the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to one week, depending upon the correlation of such factors as illustrated above.

If desired, catalysts can be incorporated into the curable compositions of the invention to increase the cure rate and/or reduce the gelation period. An advantageous method is to add the catalyst to the curable mixture at substantially the lowest temperature required to form an essentially liquid curable mixture. It is generally suitable to add the catalyst to the curable composition which is maintained at a temperature in the range of from about 10° to 100°C . Agitation of the curable composition prior to, during, and after the incorporation of the catalyst is desirable to ensure a homogeneous mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found that catalyst concentrations from about 0.005 to 15 weight percent, preferably from about 0.01 to 5 weight percent, based on the weight of the diepoxy sulfone(s) component, are advantageous in forming valuable thermoset resins from the curable compositions.

Basic and acidic catalysts which can be employed in the curable compositions include, for example, the metal halide Lewis acids, e.g., boron trifluoride, aluminum chloride, zinc chlorine, stannic chloride, ferric chloride, boron trifluoride-amine complex, boron trifluoride-piperidine complex, boron trifluoride-1,6-hexanediamine complex, boron trifluoride-monoethylamine complex, boron trifluoride-ether complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha-methylbenzyldimethylamine, dimethylethylamine, triethylamine, tripropylamine, trimethylammonium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

In one preferred embodiment the invention is directed to novel curable, partially cured, and cured compositions comprising diepoxy sulfone and polycarboxylic acid in such relative amounts as provide from about 0.1 to about 2.0 carboxyl groups, i.e., —COOH groups, of said polycarboxylic acid per epoxy group, i.e.,

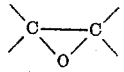

group, of said diepoxy sulfone, and preferably from about 0.3 to about 1.2 carboxyl groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, thiodiglycolic acid, 4-amyl- 2,5-heptadienedioic acid, 3-hexynedioic acid, 1,2-cyclohexanedicarboxylic acid, 1,4 - cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2-naphthalenedicarboxylic acid, 1,1,5 - pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene - 2,2,3,4 - tetracarboxylic acid, 1,2,3,4 - benzenetetracarboxylic acid, 1,2,3,5 - benzenetetracarboxylic acid, benzenepentacarboxylic acid, benzenehexacarboxylic acid, and the like. Copolymers of acrylic acid with an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable; the hydrocarbon dicarboxylic acids possessing melting points below about 200° C. are preferred.

In a second preferred embodiment the invention is directed to novel curable, partially cured, and cured compositions comprising diepoxy sulfone and polycarboxylic acid anhydride in such relative amounts so as to provide from about 0.1 to about 4.0 carboxyl groups of the polycarboxylic acid anhydride per epoxy group of the diepoxy sulfone, and preferably from about 0.8 to about 2.5 carboxyl groups per epoxy group. It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, lower alkyl substituted bicyclo[2.2.1] hept - 5 - ene-2,3 - dicarboxylic anhydride, methylbicyclo [2.2.1]hept-2-ene-2,3-dicarboxylic anhydride, and the like. Mixtures of anhydrides, polymeric anhydrides or mixed polymeric anhydrides of sebacic, adipic, pimelic, cyclohexane-1,4-dicarboxylic, terephthalic and isophthalic acids are also useful as modifiers in the preparation of the novel compositions. Acid dianhydrides such as 1,2,4,5-benzenetetracarboxylic dianhydride likewise are effective modifiers. Polycarboxylic acid anhydrides which have melting points below about 250° C. are satisfactory; those anhydrides possessing melting points below about 200° C. are preferred.

In a third preferred embodiment, the invention is directed to novel curable, partially cured, and cured compositions comprising diepoxy sulfone and polyol in such relative amounts as provide from about 0.1 to about 2.0 hydroxyl groups, i.e., —OH groups, of said polyol per epoxy group of said diepoxy sulfone, and preferably from about 0.2 to about 1.0 hydroxyl group per epoxy group. By the term "polyol," as used herein including the appended claims, is meant an organic compound having at least two hydroxyl groups, which are alcoholic hydroxyl groups, phenolic hydroxyl groups, or both alcoholic and phenolic hydroxyl groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, the butenediols, the pentanediols, the pentenediols, 2-ethyl-1,3-hexanediol, the hexenediols, 2 - methoxy - 2,4 - dimethyl - 1,5 - pentanediol, 12,13-tetracosanediol, polyglycerol, 1,1,1-trimethylolpropane, pentaerythritol, sorbitol, the polyvinyl alcohols, the octenediols, the cyclopentanediols, the cyclohexanediols, the lower alkyl substituted cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,9-naphthalenediol, the polyhydric phenolformaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable; those polyols having melting points below about 200° C. are preferred.

A fourth preferred embodiment of the invention is directed to novel curable, partially cured, and cured compositions comprising diepoxy sulfone and polycarboxy polyester in such relative amounts as provide from about 0.1 to about 2.0 carboxyl groups of said polycarboxy polyester per epoxy group of said diepoxy sulfone, and preferably from about 0.3 to about 1.2 carboxyl groups per epoxy group. By the term "polycarboxy polyester," as used herein including the appended claims, is meant a polyester which contains at least two carboxyl groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxyl groups, collectively, than are required to react with the hydroxyl groups contained in the amount of polyhydric alcohol so that the resulting esterified product, i.e., polycarboxy polyester, contains at least two free carboxyl groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion of the four preferred embodiments. Special and highly desirable effects can be imparted to the partially cured and fully cured compositions by incorporating a second active organic hardener (hereinafter termed "modifier") into the curable composition comprising diepoxy sulfone and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the diepoxy sulfone. For instance, to a curable composition comprising diepoxy sulfone and polycarboxylic acid, there can be added an amount of a modifier, e.g., polycarboxylic acid anhydride, polycarboxy polyester, polyol, etc., such that the ratio of reactive groups contained by the modifier with respect to the carboxyl groups contained by the polycarboxylic acid is less than one. On this basis the modifier can be considered to be the minor component in relation to the polycarboxylic acid. As a second illustration, if the curable composition comprises diepoxy sulfone and polyol, an amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxyl groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A fifth preferred embodiment is directed to curable, partially cured, and cured compositions comprising diepoxy sulfone and a polyfunctional amine in such relative amounts so as to provide from about 0.2 to about 5.0 amino hydrogen atoms of the polyfunctional amine per epoxy group of the sulfone, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

Illustrative polyfunctional amines include, for example, methylamine, ethylamine, propylamine, isopropylamine, butylamine, isobutylamine, 2-ethylhexylamine, 3-propylheptylamine, aniline, o-hydroxyaniline, m-toluidine, 2,3-xylidine, mesidine, benzylamine, phenethylamine, 1-naphthylamine, meta-, ortho-, and para-phenylene-diamines, 1,4-naphthalenediamine, 3,4-toluenediamine, cyclopentylamine, cyclohexylamine, p-menthane-1,8-diamine, 2-aminoethanol, 2-aminopropanol, 3-aminobutanol, 1,3-diamino-2-propanol, 2-aminophenol, 4-aminophenol, 2,3-diaminoxylenol, 4,4'-methylenedianiline, ethylenediamine, propylenediamine, butylenediamine, pentylenediamine, hexylenediamine, octylenediamine, nonylenediamine, decylenediamine, diethylenetriamine, triethylenetetramine, tetraethylenepentamine, dipropylenetriamine, and the like. The polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxyalkyl polyalkylene polyamines preferably derived from ethylenediamine, propylenediamine, diethylenetriamine, dipropylenetriamine, triethylenetetramine, and the like, and ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include the hydroxyalkyl-substituted alkylene polyamines such as N-hydroxyethylethylenediamine, N,N'-bis(hydroxyethyl)ethylenediamine, N,N-bis(hydroxyethyl)diethylenetriamine, N,N-bis(hydroxyethyl)diethylenetriamine, N,N''-bis(hydroxyethyl)diethylenetriamine, N-hydroxypropyldiethylenetriamine, N,N-bis(hydroxypropyl)diethylenetriamine, N,N''-bis(hydroxypropyl)diethylenetriamine, N-hydroxyethylpropylenediamine, N-hydroxyethyldipropylenetriamine, N,N-bis(hydroxyethyl)dipropylenetriamine, N,N'-bis-(hydroxyethyl)dipropylenetriamine, tris(hydroxyethyl)-triethylenetetramine, and the like. Other polyfunctional amines can be prepared from known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols such as for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 or 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example up to about 200° C. and subsequently adding a dihydric phenol.

Examples of still other polyfunctional amines suitably adaptable for use in the present invention include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, 4,4'-sulfonyldianiline, 3,9-bis(aminoethyl)spirobimetadioxane, hexahydrobenzamide, and others.

Polyfunctional amines formed by the addition of amines to unsaturated compounds such as acrylonitrile, ethyl acrylate, propyl acrylate, butyl crotonate, and the like are suitable.

A seventh highly preferred embodiment is directed to curable and partially cured compositions (thermosetting intermediate reaction products that are viscous liquids or solids) comprising diepoxy sulfone and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment the invention is directed to the preparation of valuable varnishes which are obtained by the reaction of diepoxy sulfone with aliphatic monocarboxylic acids, at elevated temperatures, e.g., about 100° to 200° C., for a period of time ranging from 0.5 to 10 hours, and longer, followed by homopolymerizing the resulting reaction product (which contains residual or free epoxy and hydroxyl groups) with a catalyst such as those described previously, preferably at a temperature in the range of from about 25° to 200° C., to thus produce high molecular weight polymeric products commonly known to the art as a varnish. The amounts of aliphatic monocarboxylic acid and diepoxy sulfone employed are such so as to provide from about 0.3 to about 0.7 carboxyl group of monocarboxylic acid per epoxy group of diepoxy sulfone. The unsaturated aliphatic monocarboxylic acids are preferred. Illustrative acids include hexanoic acid, caprylic acid, lauric acid, capric acid, myristic acid, oleic acid, linoleic acid, linolenic acid, oleostearic acid, licanic acid, ricinoleic acid, hexenoic acid, hexadienoic acid, octenoic acid. Acids derived from natural sources such as castor oil, dehydrated castor oil, coconut oil, cottonseed oil, oiticica oil, perilla oil, olive oil, safflower oil, sardine oil, soyabean oil, tall oil, tung oil, and the like, are advantageous to employ both from an economic standpoint and since highly useful varnishes result from the process. If desired, the reaction between diepoxy sulfone and the aliphatic monocarboxylic acid can be effected in the presence of a catalyst such as those described previously and also the reaction can be conducted in the presence of an inert normally-liquid organic medium. Suitable media include, for instance the aromatic hydrocarbon, e.g., benzene, toluene, xylene, and the like; the saturated aliphatic and cycloaliphatic hydrocarbons, e.g., hexane, heptane, cyclopentane, cyclohexane, lower alkyl substituted cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like.

The homopolymerizing of the reaction product which contains residual or free epoxy and hydroxyl groups can also be effected, if desired, in the presence of an inert normally-liquid organic medium such as those illustrated supra. The progress of the homopolymerization reaction can be observed by determining the relative viscosity of samples drawn from the reaction mixture. In this manner it is possible to produce partially polymerized compositions or essentially complete polymerized compositions.

The polymerized compositions of this embodiment generally are obtained as very viscous products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide rang of compatibility, they impart improved caustic, water, and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "driers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weigth percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment valuable varnish compositions can be obtained by the reaction of diepoxy sulfone with polyols, at a temperature in the range of from about 25° to 250° C., for a period of time ranging from about 0.5 to 10.0 hours, and longer, followed by partial or essentially complete esterification of the fusible, polymeric polyhydric product with an aliphatic moncarboxylic acid, at elevated temperatures, to produce high molecular weight polymeric products (varnishes) which may contain residual or free hydroxyl groups. The proportions of polyol and diepoxy sulfone employed are such as to provide from about 0.5 to about 1.5 hydroxyl groups of polyol per epoxy group of diepoxy sulfone. The polyols and aliphatic monocarboxylic acids which can be employed have been illustrated previously. The use of catalysts and solvents, if desired, have also been discussed supra.

As further embodiments, valuable thermoset resins can be prepared from curable compositions comprising a diepoxy sulfone(s), an active organic hardener(s), and other polyepoxides such as limonene dioxide, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(2,3-epoxycyclopentyl) ether, bis(3,4-epoxycyclohexylmethyl) pimelate, 1,1,1-trimethylolpropane tris(3,4-epoxycyclohexanecarboxylate), the polyglycidyl polyethers of polyhydric phenols, and the like. The curing of these novel curable compositions has been disclosed supra.

In some instances, the diepoxy sulfone is a mobile liquid thus making it admirably suitable as a reactive diluent when incorporated into various viscous curable systems containing a polyepoxide. In such cases, the diepoxy sulfone acts as a diluent thus reducing the viscosity of the curable system, and in addition, the diepoxy sulfone takes part in the curing reaction as a reactive component.

The cured resins of the invention vary from soft and flexible to hard and rigid products, depending upon the proportion, the functionality, and the chain length of the active organic hardener(s) employed. These resins are insoluble in many of the organic solvents. The hard, infusible, rigid, thermoset resins can be machined to desired shapes and configurations, and they can be polished to provide appealing finishes. The novel compositions, as indicated throughout the specification, are highly useful and valuable in fields such as coatings, laminating, molding, encapsulation, etc., arts.

In the following illustrative examples the examination or description of the resins were conducted at room temperature, i.e., about 24° C.

*Example 1*

Bis(2-methyl-2,3 - epoxypropyloxyethyl) sulfone and phthalic anhydride are admixed in amounts so as to provide 0.8 carboxyl group of said anhydride per epoxy group of said sulfone. The resulting admixture then is heated to 120° C. for 5 hours plus an additional 6 hours at 160° C. There is obtained a hard resin.

In an analogous manner as above, when bis(3,4-epoxy-cyclohexyloxymethyl) sulfone is admixed with succinic anhydride in amounts so as to provide 1.0 carboxyl group of said anhydride per epoxy group of said sulfone, followed by curing the resulting admixture under essentially similar operative conditions, there is obtained a hard, infusible resin.

*Example 2*

Bis(3-oxatricyclo[3.2.1.0$^{2,4}$] - 6 - octyloxyethyl sulfone and phthalic anhydride are admixed in amounts so as to provide 1.0 carboxyl group of said anhydride per epoxy groups of said sulfone. The resulting admixture then is heated to 120° C. for 5 hours plus an additional 6 hours at 160° C. There was obtained a hard, tough resin.

In an analogous manner as above, when 2,3-epoxypropyl 3-oxatetracyclo[4.4.0.1$^{7,10}$.0$^{2,4}$]-8-undecyloxyethyl sulfone is admixed with 1,8-naphthalic anhydride in amounts so as to provide 1.5 carboxyl groups of said anhydride per epoxy group of said sulfone, followed by curing the resulting admixture under essentially similar operative conditions, there is obtained a solid resin.

*Example 3*

Bis(2,3-epoxycyclohexyloxypropyl) sulfone and phthalic anhydride are admixed in amounts so as to provide 1.25 carboxyl groups of said anhydride per epoxy group of said sulfone. The resulting admixture then is heated to 120° C. for 10 hours plus an additional 10 hours at 160° C. There is obtained a hard, tough resin.

In an analogous manner as above, when bis(2-methyl-2,3-epoxypropyloxypropyl) sulfone is admixed with maleic anhydride in amounts so as to provide 1.0 carboxyl group of said anhydride per epoxy group of said sulfone, followed by curing the resulting admixture under essentially similar operative conditions, there is obtained a hard resin.

*Example 4*

Bis(3,4-epoxycyclohexylmethyloxyethyl) sulfone and tetrahydrophthalic anhydride (0.76 gram) are admixed in amounts so as to provide 1.0 carboxyl group of said anhydride per epoxy group of said sulfone. The resulting admixture then is heated to 120° C. for 6 hours plus an additional 16 hours at 160° C. There was obtained a hard, tough resin.

*Example 5*

Bis(2-ethyl-2,3-epoxypropyloxypropyl) sulfone and glutaric anhydride are admixed in amounts so as to provide 1.2 carboxyl groups of said anhydride per epoxy group of said sulfone. The resulting admixture then is heated to 120° C. for 6 hours plus an additional 10 hours at 160° C. There was obtained a solid resin.

*Example 6*

Bis(3,4-epoxybutyloxypropyl) sulfone, chlorendic anhydride, and ethylene glycol are admixed in amounts so as to provide 1.0 carboxyl group of said anhydride and 0.3 hydroxyl group of said glycol per epoxy group of said sulfone. The resulting admixture then is heated to 120° C. for 6 hours plus an additional 6 hours at 160° C. There is obtained a hard resin.

*Example 7*

Bis(2-methyl-2,3 - epoxypropyloxyethyl) sulfone and adipic acid are admixed in amounts so as to provide 0.6 carboxyl group of said acid per epoxy group of said sulfone. The resulting admixture then is heated to 120° C. for 6 hours plus an additional 6 hours at 160° C. There is obtained a hard, tough resin.

*Example 8*

Bis(3-oxatricyclo[3.2.1.0$^{2,4}$]-6-octyloxypropyl) sulfone and sebacic acid are admixed in amounts so as to provide 1.0 carboxyl group of said acid per epoxy group of said sulfone. The resulting admixture then was heated to 120° C. for 6 hours plus an additional 6 hours at 160° C. There is obtained a hard resin.

In an analogous manner as above, bis(10,11-epoxy-undecyloxyethyl) sulfone is admixed with citraconic acid in amounts so as to provide 1.1 carboxyl group of said acid per epoxy group of said sulfone, followed by curing the resulting admixture under essentially similar operative conditions, there is obtained a solid resin.

*Example 9*

Bis,2-methyl-2,3-epoxypropyloxypropyl) sulfone and bis(4 - hydroxyphenyl) - 2,2 - propane are admixed in amounts so as to provide 1.0 hydroxyl group of said bis(4-hydroxyphenyl)-2,2-propane per epoxy group of said sulfone. The resulting admixture then is heated to 120° C. for 12 hours plus an additional 6 hours at 160° C. There is obtained a hard resin.

*Example 10*

Bis(2-methyl-2,3-epoxypropyloxypropyl) sulfone and resorcinol are admixed in amounts so as to provide 1.0 hydroxyl group of said resorcinol per epoxy group of said sulfone. The resulting admixture then is heated to 120° C. for 12 hours plus an additional 6 hours at 160° C. There was obtained a hard resin.

In an analogous manner as above, when bis(3-oxatetracyclo[4.4.0.1$^{7,10}$.0$^{2,4}$]-8-undecyloxyethyl sulfone is admixed with catechol in amounts so as to provide 1.0 hydroxyl group of said anhydride per epoxy group of said sulfone, followed by curing the resulting admixture under essentially similar operative conditions, there is obtained a hard resin.

*Example 11*

Bis(9,10-epoxyoctadecyloxyethyl) sulfone and pyrogallol are admixed in amounts so as to provide 1.0 hydroxyl group of said anhydride per epoxy group of said sulfone. The resulting admixture then is heated to 120° C. for 12 hours plus an additional 6 hours at 160° C. There is obtained a hard resin.

In an analogous manner as above, when 2,3-epoxypropyloxyethyl 3,4-epoxycyclohexyloxyethyl sulfone is admixed with glycerol in amounts so as to provide 1.0 hydroxyl group of said glycerol per epoxy group of said sulfone, followed by curing the resulting admixture under essentially similar operative conditions, there is obtained a hard resin.

*Example 12*

Bis(2-methyl-2,3-epoxypropyloxyethyl) sulfone and diethylenetriamine are admixed in amounts so as to provide 1.0 amino hydrogen atom of said amine per epoxy group of said sulfone. The resulting admixture then is heated to 120° C. for 6 hours plus an additional 16 hours at 160° C. There is obtained a hard resin.

*Example 13*

Bis(3,4-epoxycyclohexylmethyloxymethyl) sulfone and xylylenediamine are admixed in amounts so as to provide 2.0 amino hydrogen atoms of said amine per epoxy group of said sulfone. The resulting admixture then is heated to 120° C. for 6 hours plus an additional 16 hours at 160° C. There is obtained a hard resin.

*Example 14*

Bis(2-methyl-2,3-epoxypropyloxyethyl) sulfone and 1,6-hexanediamine are admixed in amounts so as to provide 1.0 amino hydrogen atom of said amine per epoxy group of said sulfone. The resulting admixture then is heated to 120° C. for 6 hours plus an additional 12 hours at 160° C. There is obtained a hard resin.

*Example 15*

Bis(2,3-epoxycyclohexylmethyloxypropyl) sulfone and 4,4'-methylenedianiline is admixed in amounts so as to provide 2.0 amino hydrogen atoms of said amine per epoxy group of said sulfone. The resulting admixture then is heated to 120° C. for 6 hours plus an additional 16 hours at 160° C. There is obtained a hard, tough resin.

*Example 16*

A mixture is prepared from bis(2-methyl-2,3-epoxypropyloxyethyl) sulfone and adipic acid in amounts so as to provide 1.0 carboxyl group per epoxy group. The resulting mixture is heated to 120° C. for a period 10 minutes, and upon cooling to room temperature, i.e., approximately 25° C., a thermosetting product is obtained. The resulting product is dissolved in methyl isobutyl ketone at 100° C., and an iron panel or strip is dipped into the resulting solution. The iron panel subsequently is removed from this solution, is air dried for 15 minutes, and is baked at 160° C. for 2 hours. A thin coating is observed on that portion of the dipped iron panel. The resulting coating on the panel is glossy and tough. The coating displays excellent adhesion to the panel.

*Example 17*

A mixture is prepared from bis(3 - oxatricyclo-[3.2.1.0$^{2,4}$]-6-octyloxyethyl) sulfone and phthalic anhydride in amounts so as to provide 1.0 carboxyl group per epoxy group. The resulting mixture is heated to 120° C. for a period of 5 minutes, and upon cooling to room temperature, i.e., approximately 250° C., a thermosetting product is obtained. The resulting product is dissolved in butyl acetate at 100° C., and an iron panel or strip is dipped into the resulting solution. The iron panel is removed almost immediately from this solution, is allowed to air dry for 15 minutes, and subsequently is baked at 160° C. for 15 minutes. A thin coating is observed on that portion of the dipped iron panel. The resulting coating on the panel is hard and tough. The coating displays excellent adhesion to the panel.

*Example 18*

Bis(2-methyl-2,3-epoxypropyloxypropyl) sulfone and dehydrated castor oil acid are admixed in amounts so as to provide 0.5 carboxyl group of said acid per epoxy group of said sulfone. The resulting admixture then is heated for 0.7 hour at 180° C. to give a viscous product mixture which contained residual or free epoxy groups and hydroxyl groups. This viscous product mixture subsequently is charged to a round-bottom flask which is fitted with an air stirrer, nitrogen pure line, thermometer, and dropping funnel. Sufficient xylene solvent is added to give a 90 weight percent solution and the temperature of the resulting admixture is brought to about 55° to 60° C. An amount of stannic chloride (0.3 weight percent based on the weight of said viscous product mixture) contained as a solution in ethyl acetate is then added dropwise to said admixture over a period of approximately 45 minutes. As the polymerization proceeds sufficient xylene is added thereto to facilitate stirring. The solids content of the resulting solution is about 55 weight percent. To the resulting high molecular weight polymeric product mixture (varnish), a Parkerized steel panel is dipped therein. The resulting coated panel is air-dried for 30 minutes and is baked at 170° C. for 30 minutes. The coated panel resistance to boiling water (one hour) and caustic 20 percent NaOH for 20 minutes) is excellent.

*Example 19*

Bis(3,4-epoxycyclohexyloxyethyl) sulfone and soya bean oil acid are admixed in amounts so as to provide 0.4 carboxyl group of said acid per epoxy group of said sulfone. The resulting admixture then is heated for 0.9 hour at 180° C. to give a viscous product mixture which contained residual or free epoxy groups and hydroxyl groups. The viscous product mixture subsequently is charged to a round-bottomed flask which is fitted with an air stirrer, nitrogen purge line, thermometer, and dropping funnel. Sufficient xylene solvent is added to give a 85 weight percent solution and the temperature of the resulting admixture is brought to about 50° to 60° C. An amount of boron trifluoride-diethyl ether complex (0.2 weight percent of boron trifluoride based on the weight of said viscous product mixture) contained in excess diethyl ether is then added dropwise to said admixture over a period of approximately 30 minutes. As the polymerization proceeds sufficient xylene is added thereto to facilitate stirring. The solids content of the resulting solution is about 50 weight percent. To the resulting high molecular weight polymeric product mixture (varnish), a Parkerized steel panel is dipped therein. The resulting coated panel is air-dried for 20 minutes and is baked at 175° C. for 30 minutes. The coated panel resistance to boiling water (one hour) and caustic (20 percent NaOH for 20 minutes) is excellent.

*Example 20*

Ethylene glycol (45 grams), toluene (400 grams), and stannic chloride (2.0 grams) are charged to a reaction flask which is fitted with an air stirrer, thermometer, and dropping funnel. The resulting mixture is heated to about 100° C. and an amount of bis(2-methyl-2,3-epoxypropyloxyethyl) sulfone (sufficient to provide one epoxy group per hydroxyl group of said ethylene glycol) is added dropwise thereto over a period of 30 minutes. The reaction mixture subsequently is allowed to cool to about 75° C., and thereafter ice water is added to the reaction mixture, with stirring, to thus form a heterogeneous polymer-solvent-water mixture. The liquid portion is decanted into a separating funnel and the remaining solid polymer phase is dissolved in hexanone; the resulting solution is then added to the decanted material. The resulting mixture subsequently is shaken with additional water and is allowed to stand overnight at room temperature after which time the polymer solution phase is recovered. The polymer solution phase is added to a two-liter flask fitted with a distillation head, a vacuum pump, and a heating mantle. The solvents (cyclohexanone and toluene) are removed by heating at elevated temperatures and under reduced pressure. On cooling, there is obtained a polymeric polyhydric solid product. This product, dehydrated castor oil acid in an amount to cause essentially complete esterification, and xylene then are charged to a two-liter flask fitted with a stirrer, a nitrogen purge line, a thermometer, a distillation head, and a heating mantle. The mixture is heated to about 240° C. and is maintained thereat for approximately 2 hours during which period of time the water which is formed from esterification is removed at the stillhead as an azeotrope with xylene. The reaction mixture is allowed to cool to about 120° C., and sufficient xylene is added to afford a varnish solution containing about 75 weight percent non-volatiles.

To 100 parts by weight of the above said varnish solution there is added 15 parts by weight of xylene. To this resulting solution there is added 0.015 part by weight of cobalt naphthenate. Subsequently, a black iron panel is dipped in the varnish solution. The panel is removed almost immediately from said solution, is allowed to airy dry for 30 minutes, and subsequently, is baked at 160° C. for 30 minutes. The resulting coating on the panel is glossy, tough, and resistant to cracking on continual bending (over 90 degree bends) of the panel. The coating displayed excellent adhesion and excellent resistance to caustic.

*Example 21*

Bis(2-methyl-2,3-epoxypropyloxyethyl) sulfone (2.60 grams) and diethylenetriamine (0.22 grams) were admixed in a vessel and heated to 120° C. for 10 hours, plus an additional 8 hours at 160° C. There was obtained a soft, amber-colored resin.

*Example 22*

Bis(2-methyl-2,3-epoxypropyloxyethyl) sulfone (2.60 grams) and 4,4'-methylenedianiline (0.50 gram) were admixed in a vessel and heated to 120° C. for 10 hours plus an additional 8 hours at 160° C. There was obtained a tough, amber-colored resin.

*Example 23*

Bis(6-methyl-3,4-epoxycyclohexylmethyloxyethyl) sulfone (7.0 grams) and phthalic anhydride (1.1 grams) were admixed in a vessel and heated to 120° C. for 10 hours plus an additional 8 hours at 160° C. There was obtained a hard, tough resin.

*Example 24*

Bis(6-methyl-3,4-epoxycyclohexylmethyloxyethyl) sulfone (7.0 grams) and chlorendic anhydride (2.0 grams) were admixed in a vessel and heated to 120° C. for 10 hours plus an additional 8 hours at 160° C. There was obtained a hard, tough resin.

*Example 25*

Bis(6-methyl-3,4-epoxycyclohexylmethyloxyethyl) sulfone (7.0 grams) and maleic anhydride (0.8 gram) were admixed in a vessel and heated to 120° C. for 10 hours plus an additional 8 hours at 160° C. There was obtained a hard, tough resin.

Reasonable variations and modifications of the invention can be made or carried out in the light of the above disclosure without departing from the spirit and scope thereof.

What is claimed is:

1. A copolymerizable composition comprising a diepoxy sulfone characterized by the formula $$R-O-X-SO_2-X-O-R$$

wherein each R, individually, is selected from the group consisting of (a) a vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexylalkyl radical, (d) a 3-oxatricyclo[3.2.1.0$^{2,4}$]-oct-6-yl radical, and (e) a 3-oxatetracyclo[4.4.0.1$^{7,10}$.0$^{2,4}$]unde-8-yl radical; and wherein each X, individually, is a divalent saturated aliphatic hydrocarbon radical which contains at least 2 carbon atoms in the divalent chain; and a curing amount of an active organic hardener selected from the group consisting of polycarboxylic acids, polycarboxylic acid anhydrides, polyhydric alcohols, polyhydric phenols, polycarboxy polyesters, polyfunctional amines, polythiols, polyisocyanates, polythioisocyanates, and polyacyl halides.

2. A cured, thermoset resin obtained from the composition defined in claim 1.

3. The composition of claim 1 wherein said active organic hardener is a polycarboxylic acid which is employed in an amount so as to provide from about 0.1 to about 2.0 carboxyl groups per epoxy group of said diepoxy sulfone.

4. The composition of claim 1 wherein said active organic hardener is a polycarboxylic acid anhydride which is employed in an amount so as to provide from about 0.1 to about 4.0 carboxyl groups per epoxy group of said diepoxy sulfone.

5. The composition of claim 1 wherein said active organic hardener is a polyhydric alcohol which is employed in an amount so as to provide from about 0.1 to about 2.0 hydroxyl groups per epoxy group of said diepoxy sulfone.

6. The composition of claim 1 wherein said active organic hardener is a polyhydric phenol which is employed in an amount so as to provide from about 0.1 to about 2.0 hydroxyl groups per epoxy group of said diepoxy sulfone.

7. The composition of claim 1 wherein said active organic hardener is a polycarboxy polyester which is employed in an amount so as to provide from about 0.1 to about 2.0 carboxyl groups per epoxy group of said diepoxy sulfone.

8. The composition of claim 1 wherein said active organic hardener is a polyfunctional amine which is employed in an amount so as to provide from about 0.2 to about 5.0 amino hydrogen atoms per epoxy group of said diepoxy sulfone.

9. A cured, thermoset resin obtained from the composition defined in claim 3.

10. A cured, thermoset resin obtained from the composition defined in claim 4.

11. A cured, thermoset resin obtained from the composition defined in claim 5.

12. A cured, thermoset resin obtained from the composition defined in claim 6.

13. A cured, thermoset resin obtained from the composition defined in claim 7.

14. A cured, thermoset resin obtained from the composition defined in claim 8.

15. A polymerizable composition comprising a bis(vic-epoxyalkyloxyalkyl) sulfone wherein the vic-epoxy group is at least one carbon atom removed from the oxy group, and wherein the oxy group is at least 2 carbon atoms removed from the sulfonyl group; and a polycarboxylic acid in such relative amounts as to provide from about 0.1 to about 2.0 carboxyl groups of said acid per epoxy group of said sulfone.

16. The cured, thermoset resin obtained from the composition defined in claim 15.

17. A polymerizable composition comprising a bis(vic-epoxyalkyloxyalkyl) sulfone wherein the vic-epoxy group is at least one carbon atom removed from the oxy group, and wherein the oxy group is at least 2 carbon atoms removed from the sulfonyl group; and a polycarboxylic acid anhydride in such relative amounts as to provide from about 0.1 to about 4.0 carboxyl groups of said anhydride per epoxy group of said sulfone.

18. The cured, thermoset resin obtained from the composition defined in claim 17.

19. A polymerizable composition comprising a bis(vic-epoxyalkyloxyalkyl) sulfone wherein the vic-epoxy group is at least one carbon atom removed from the sulfonyl group, and wherein the oxy group is at least 2 carbon atoms removed from the sulfonyl group; and a polyol in such relative amounts as to provide from about 0.1 to about 2.0 hydroxyl groups of said polyol per epoxy group of said sulfone.

20. The cured, thermoset resin obtained from the composition defined in claim 19.

21. A polymerizable composition comprising a bis(vic-epoxycyclohexyloxyalkyl) sulfone wherein the epoxy group is at least one carbon atom removed from the oxy group, and wherein the oxy group is at least 2 carbon atoms removed from the sulfonyl group; and a polycarboxylic acid in such relative amounts as to provide from about 0.1 to about 2.0 carboxyl groups of said acid per epoxy group of said sulfone.

22. The cured, thermoset resin obtained from the composition defined in claim 21.

23. A polymerizable composition comprising a bis(vic-epoxycyclohexyloxyalkyl) sulfone wherein the epoxy group is at least one carbon atom removed from the oxy group, and wherein the oxy group is at least 2 carbon atoms removed from the sulfonyl group; and a polycarboxylic acid anhydride in such relative amounts as to provide from about 0.1 to about 4.0 carboxyl groups of said anhydride per epoxy group of said sulfone.

24. The cured, thermoset resin obtained from the composition defined in claim 23.

25. A polymerizable composition comprising a bis(vic-epoxycyclohexyloxyalkyl) sulfone wherein the epoxy group is at least one carbon atom removed from the oxy group, and wherein the oxy group is at least 2 carbon atoms removed from the sulfonyl group; and a polyol in such relative amounts as to provide from about 0.1 to about 2.0 hydroxyl groups of said polyol per epoxy group of said sulfone.

26. The cured, thermoset resin obtained from the composition defined in claim 25.

27. A polymerizable composition comprising a bis(3-oxatricyclo[3.2.1.0$^{2,4}$]-6-octyloxyalkyl) sulfone, the oxy group of which is at least 2 carbon atoms removed from the sulfonyl group; and a polycarboxylic acid in such relative amounts as to provide from about 0.1 to about 2.0 carboxyl groups of said acid per epoxy group of said sulfone.

28. The cured, thermoset resin obtained from the composition defined in claim 27.

29. A polymerizable composition comprising a bis(3-oxatricyclo[3.2.1.0$^{2,4}$]-6-octyloxyalkyl) sulfone, the oxy group of which is at least 2 carbon atoms removed from the sulfonyl group; and a polycarboxylc acid anhydride in such relative amounts as to provide from about 0.1 to about 4.0 carboxyl groups of said anhydride per epoxy group of said sulfone.

30. The cured, thermoset resin obtained from the composition defined in claim 29.

31. A polymerizable composition comprising a bis(3-oxatricyclo[3.2.1.0$^{2,4}$]-6-octyloxyalkyl) sulfone, the oxy group of which is at least 2 carbon atoms removed from the sulfonyl group; and a polyol in such relative amounts as to provide from about 0.1 to about 2.0 hydroxyl groups of said polyol per epoxy group of said sulfone.

32. The cured, thermoset resin obtained from the composition defined in claim 31.

33. A polymerizable composition comprising a bis(3-oxatetracyclo[4.4.0.1$^{7,10}$.0$^{2,4}$] - 8 - undecyloxyalkyl) sulfone, the oxy group of which is at least 2 carbon atoms removed from the sulfonyl group; and a polycarboxylic acid in such relative amounts as to provide from about 0.1 to about 2.0 carboxyl groups of said acid per epoxy group of said sulfone.

34. The cured, thermoset resin obtained from the composition defined in claim 33.

35. A polymerizable composition comprising a bis(3-oxatetracyclo[4.4.0.1$^{7,10}$.0$^{2,4}$] - 8 - undecyloxyalkyl) sulfone, the oxy group of which is at least 2 carbon atoms removed from the sulfonyl group; and a polycarboxylic acid anhydride in such relative amounts as to provide from about 0.1 to about 4.0 carboxyl groups of said anhydride per epoxy group of said sulfone.

36. The cured, thermoset resin obtained from the composition defined in claim 35.

37. A polymerizable composition comprising a bis(3-oxatetracyclo[4.4.0.1$^{7,10}$.0$^{2,4}$] - 8 - undecyloxyalkyl) sulfone, the oxy group of which is at least 2 carbon atoms removed from the sulfonyl group; and a polyol in such relative amounts as to provide from about 0.1 to about 2.0 hydroxyl groups of said polyol per epoxy group of said sulfone.

38. The cured, thermoset resin obtained from the composition defined in claim 37.

39. A polymerizable composition comprising a bis(vic-epoxycyclohexylalkyloxyalkyl) sulfone, the oxy group of which is at least 2 carbon atoms removed from the sulfonyl group; and a polycarboxylic acid in such relative amounts so as to provide from about 0.1 to about 2.0 carboxyl groups of said acid per epoxy group of said sulfone.

40. The cured, thermoset resin obtained from the composition defined in claim 39.

41. A polymerizable composition comprising a bis-(vic-epoxycyclohexylalkyloxyalkyl) sulfone, the oxy group of which is at least 2 carbon atoms removed from the sulfonyl group; and a polycarboxylic acid anhydride in such relative amounts so as to provide from about 0.1 to about 4.0 carboxyl groups of said anhydride per epoxy group of said sulfone.

42. The cured, thermoset resin obtained from the composition defined in claim 41.

43. A polymerizable composition comprising a bis-(vic-epoxycyclohexylalkyloxyalkyl) sulfone, the oxy group of which is at least 2 carbon atoms removed from the sulfonyl group; and a polyol in such relative amounts so as to provide from about 0.1 to about 2.0 hydroxyl groups of said polyol per epoxy group of said sulfone.

44. The cured, thermoset resin obtained from the composition defined in claim 43.

45. A resin prepared from a polymerizable composition comprising bis(6 - methyl - 3,4 - epoxycyclohexylmethyloxyethyl) sulfone, and phthalic anhydride in such relative amounts so as to provide from about 0.1 to about 4.0 carboxyl groups of said anhydride per epoxy group of said sulfone.

46. A resin prepared from a polymerizable composition comprising bis(6 - methyl - 3,4 - epoxycyclohexylmethyloxyethyl) sulfone and tetrahydrophthalic anhydride in such relative amounts so as to provide from about 0.1 to about 4.0 carboxyl groups of said anhydride per epoxy group of said sulfone.

47. A resin prepared from a polymerizable composition comprising bis(2-methyl-2,3-epoxypropyloxyethyl) sulfone, and maleic anhydride in such relative amounts so as to provide from about 0.1 to about 4.0 carboxyl groups of said anhydride per epoxy group of said sulfone.

48. Thermosetting intermediate reaction products resulting from the partial reaction of a polymerizable composition comprising a diepoxy sulfone characterized by the formula

R—O—X—SO$_2$—X—O—R wherein each R, individually, is selected from the group consisting of (a) a vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexylalkyl radical, (d) a 3-oxatricyclo[3.2.1.0$^{2,4}$]oct-6-yl radical, and (e) a 3-oxatetracyclo[4.4.0.1$^{7,10}$.0$^{2,4}$]undec-8-yl radical; and wherein each X, individually, is a divalent saturated aliphatic hydrocarbon radical which contains at least 2 carbon atoms in the divalent chain; and a curing amount of an active organic hardener selected from the group consisting of polycarboxylic acids, polycarboxylic acid anhydrides, polyhydric alcohols, polyhydric phenols, polycarboxy polyesters, polyfunctional amines, polythiols, polyisocyanates, polythioisocyanates, and polyacyl halides; said thermosetting intermediate reaction products being dissolved in an inert normally-liquid organic medium, the resulting solution comprising from about 10 to about 90 weight percent of said thermosetting intermediate reaction products, based on the total weight of said thermosetting intermediate reaction products and said organic medium.

49. A polymerizable composition comprising a diepoxy sulfone characterized by the formula

wherein each R, individually, is selected from the group consisting of (a) a vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexyl radical, (d) a 3-oxatricyclo[3.2.1.0$^{2,4}$]oct-6-yl radical, and (e) a 3-oxatetracyclo[4.4.0.1$^{7,10}$.0$^{2,4}$]undec-8-yl radical; and wherein each X, individually, is a divalent saturated aliphatic hydrocarbon radical which contains at least 2 carbon atoms in the divalent chain; and an aliphatic unsaturated monocarboxylic acid in amounts so as to provide from about 0.3 to about 0.7 carboxyl group of said acid per epoxy group of said sulfone.

50. The reaction product of the composition defined in claim 51, said product containing free hydroxyl and epoxy groups.

51. A varnish composition obtained by homopolymerizing the reaction product defined in claim 50.

52. A process for producing a fatty acid ester which contains free vic-epoxy groups which comprises interacting a diepoxy sulfone defined in claim 1 with an aliphatic monocarboxylic acid in amounts so as to provide from about 0.3 to about 0.7 carboxyl group of said acid per epoxy group of said sulfone.

53. A process for producing a varnish composition which comprises homopolymerizing the fatty acid ester product of claim 52.

References Cited in the file of this patent

UNITED STATES PATENTS

| | | |
|---|---|---|
| 2,794,007 | Taylor | May 28, 1957 |
| 2,831,830 | Schroeder | Apr. 22, 1958 |

UNITED STATES PATENT OFFICE
CERTIFICATION OF CORRECTION

Patent No. 3,019,203                                              January 30, 1962

Charles T. Patrick, Jr., et al.

It is hereby certified that error appears in the above numbered patent requiring correction and that the said Letters Patent should read as corrected below.

Column 2, line 47, for "atoms" read -- atom --; column 3, line 30, for "bis(vie-" read -- bis(vic- --; column 4, lines 74 and 75, after "sulfide" insert -- under the operative conditions noted in the epoxidation process discussed supra. In this reaction, the sulfide --; column 5, lines 1 and 2, strike out "tion process discussed supra. In this reaction, the sulfide moiety, i.e., -S-, is oxidized to the sulfonyl group,"; line 17, after "acid" strike out the comma; column 6, line 28, for "chlorine" read -- chloride --; column 12, line 24, for "rang" read -- range --; line 37, for "weigth" read -- weight --; column 14, line 43, for "Bis,2-methyl-" read -- Bis(2-methyl- --; column 15, line 59, for "250° C." read -- 25° C. --; column 16, line 20, before "2" insert an opening parenthesis; column 17, line 75, for "]unde-" read ]undec- --.

Signed and sealed this 12th day of June 1962.

(SEAL)
Attest:

ERNEST W. SWIDER                                              DAVID L. LADD
Attesting Officer                                                 Commissioner of Patents